United States Patent
Robbins et al.

(10) Patent No.: US 8,625,755 B2
(45) Date of Patent: *Jan. 7, 2014

(54) METHOD AND APPARATUS FOR MANAGING CONTACT BOOKS

(71) Applicant: AT&T Intellectual Property I, LP, Atlanta, GA (US)

(72) Inventors: William Stanley Robbins, Sun Prairie, WI (US); R. Tyler Wallis, Dalls, TX (US); Anup D. Karnalkar, Allen, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,366

(22) Filed: Mar. 11, 2013

(65) Prior Publication Data

US 2013/0195261 A1    Aug. 1, 2013

Related U.S. Application Data

(63) Continuation of application No. 12/181,027, filed on Jul. 28, 2008, now Pat. No. 8,437,456.

(51) Int. Cl.
*H04M 11/00* (2006.01)
(52) U.S. Cl.
USPC ............. 379/93.02; 379/93.01; 379/355.04
(58) Field of Classification Search
USPC ............. 379/93.01, 93.02, 355.01–355.07
See application file for complete search history.

(56) References Cited

U.S. PATENT DOCUMENTS

| | | |
|---|---|---|
| 2004/0052356 A1 | 3/2004 | McKinzie |
| 2005/0243993 A1 | 11/2005 | McKinzie |
| 2007/0021108 A1 | 1/2007 | Bocking |
| 2007/0127442 A1 | 6/2007 | O'Neil |
| 2007/0189501 A1 | 8/2007 | Lai |
| 2009/0227246 A1 | 9/2009 | Guedalia |
| 2010/0088430 A1 | 4/2010 | Ton |
| 2010/0235476 A1 | 9/2010 | Lin |
| 2011/0060632 A1 | 3/2011 | Sivalingham |
| 2011/0289050 A1 | 11/2011 | McCarthy |

OTHER PUBLICATIONS

Grandcentral Communications From, ,"One Address Book", One page article; www.grandcentral.com/home/one_addressbook, website last visited Jul. 24, 2008.

Plaxo, Inc., , "Downloads> Outlook and Outlook Express", One page article; www.plaxo.com/downloads/ outlook, website last visited Jul. 24, 2008.

*Primary Examiner* — Stella Woo

(74) *Attorney, Agent, or Firm* — Guntin & Gust, PLC; Douglas Schnabel

(57) ABSTRACT

A system that incorporates teachings of the present disclosure may include, for example, a system having a controller to receive from a first communication device (CD) a telephone number of a second CD, submit a verification code to the second CD, submit a request to the first CD for the verification code, receive the verification code from the first CD, provide the first CD access to update in whole or in part a second contact book of the second CD stored in a contact book account, receive from the first CD one or more entries of a first contact book of the first CD, merge the one or more entries of the first contact book with one or more entries of the second contact book, thereby generating an updated second contact book, and store the updated second contact book in the contact book account. Additional embodiments are disclosed.

20 Claims, 8 Drawing Sheets

100

200

500

600

METHOD AND APPARATUS FOR MANAGING CONTACT BOOKS

CROSS-REFERENCE TO RELATED APPLICATIONS

This application is a continuation of and claims priority to U.S. patent application Ser. No. 12/181,027 filed Jul. 28, 2008 which is incorporated herein by reference in its entirety.

FIELD OF THE DISCLOSURE

The present disclosure relates generally to contact book management techniques and more specifically to a method and apparatus for managing contact books.

BACKGROUND

Communication devices such as cellular telephones, home and office phones can store one or more contact books. Contact book entries can include a person's name, a picture of the person, home and/or office correspondence addresses, phone numbers, email addresses, instant messaging addresses, website addresses, and other desirable information. It is common for a single user to have multiple communication devices, each communication device with an independently operated contact book.

DETAILED DESCRIPTION

One embodiment of the present disclosure entails a system having a controller to receive from a first communication device a telephone number of a second communication device which is subscribed to a contact book account of the system, submit a verification code to the second communication device, submit a request to the first communication device for the verification code, receive the verification code from the first communication device, provide the first communication device access to update in whole or in part a second contact book of the second communication device stored in the contact book account, receive from the first communication device one or more entries of a first contact book of the first communication device, merge the one or more entries of the first contact book with one or more entries of the second contact book, thereby generating an updated second contact book, and store the updated second contact book in the contact book account.

Another embodiment of the present disclosure entails a computer-readable storage medium having computer instructions for receiving from a first communication device a request to synchronize at least a portion of a first contact book of the first communication device with a second contact book of a second communication device, submitting to the second communication device a notice of the request, receiving an authorization indicator from one of the first and second communication devices, synchronizing the portion of the first contact book with the second contact book responsive to a validation of the authorization indicator, and storing the synchronized contact book in a contact book account of the second communication device.

Yet another embodiment of the present disclosure entails a method involving synchronizing a first contact book of a first communication device with a second contact book of a second communication device responsive to submitting an authentication code to the second communication device, and receiving the authentication code from one of the first and second communication devices.

Another embodiment of the present disclosure entails a first communication device having a controller to transmit to a system a request to synchronize a first contact book of the first communication device with a second contact book of a second communication device, receive from the system a request for a verification code transmitted by the system to the second communication device, transmit to the system the verification code, and transmit to the system the first contact book for synchronization with the second contact book.

Figure 1:
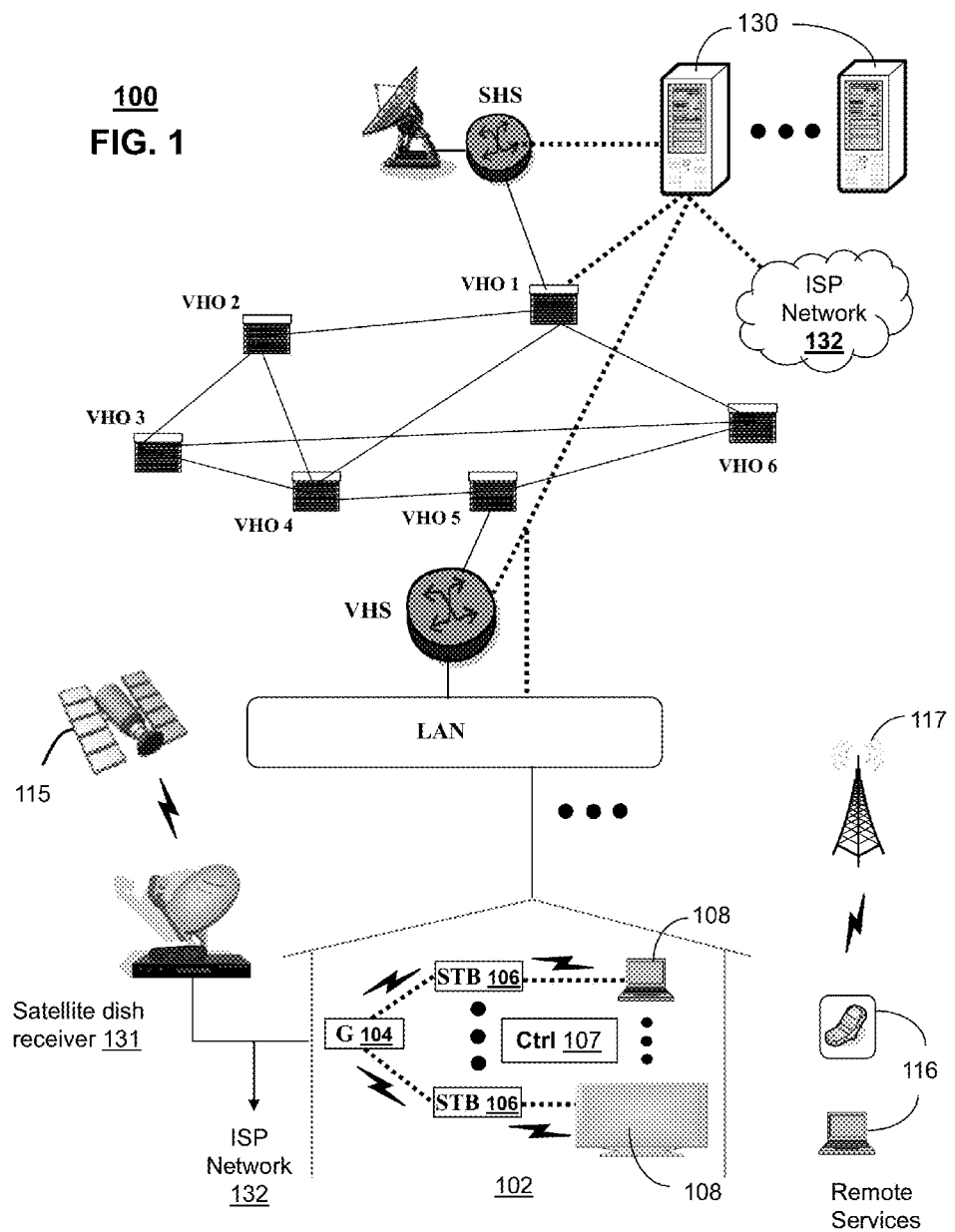
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as one or more common web servers for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). One of said portals can correspond to a contact book management system (herein referred to as CBMS 130). The CBMS 130 can be used for archiving, managing, and synchronizing contact books of a multiplicity of communication devices as described by method 700 of FIG. 7.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
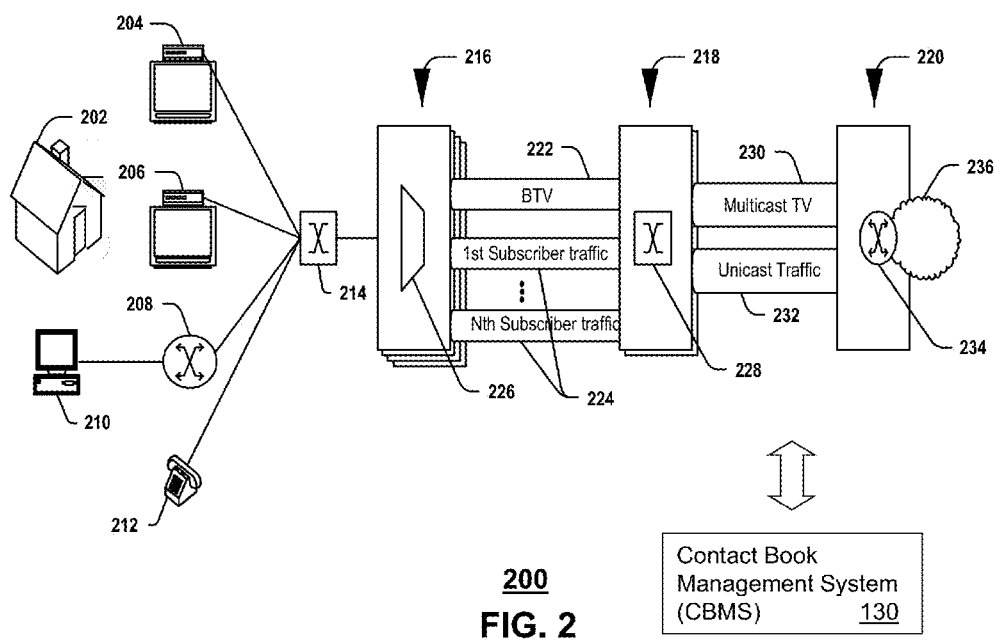

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The CBMS 130 of FIG. 1 can be operably coupled to the second communication system 200 for purposes similar to those described above.

Figure 3:
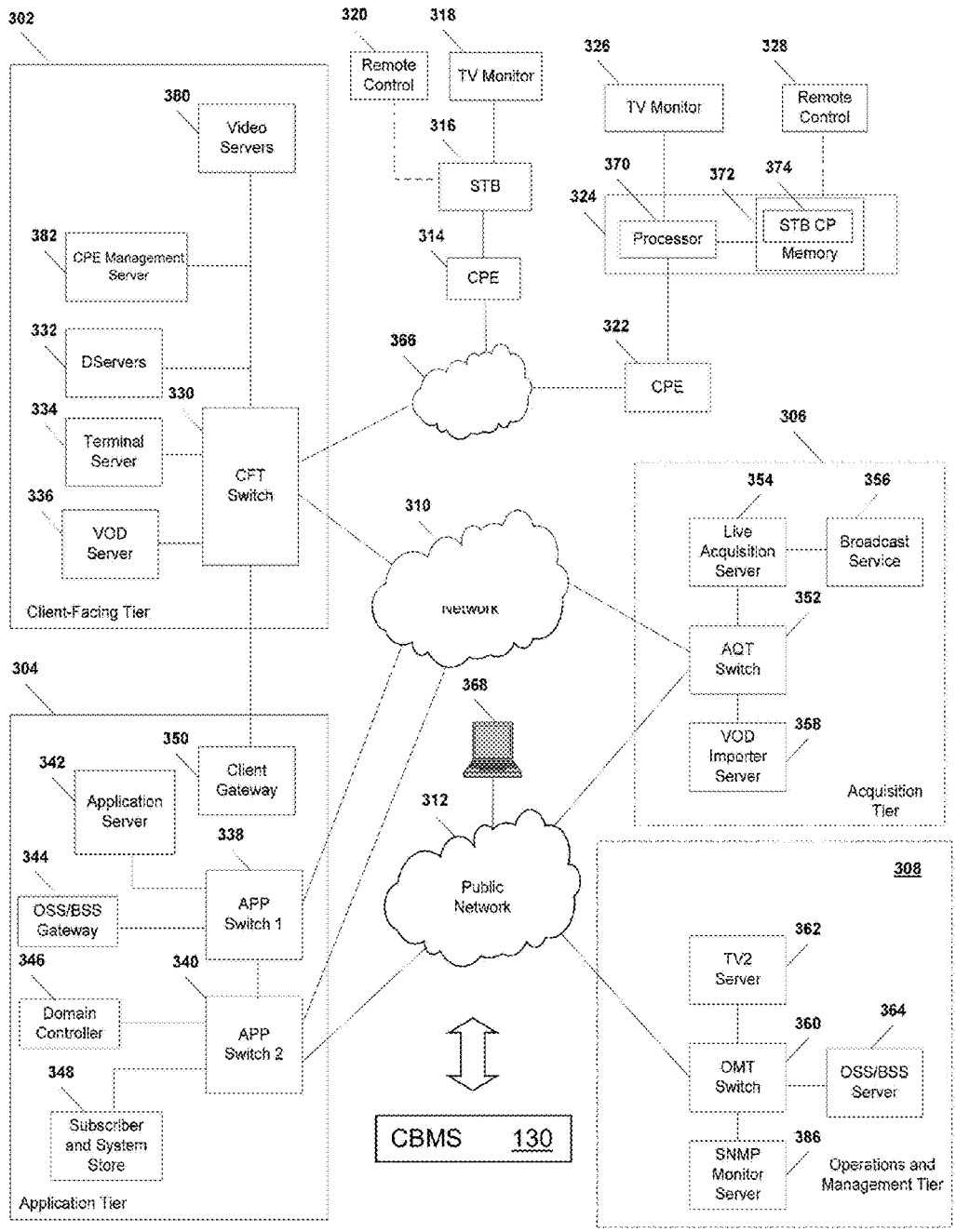

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The CBMS 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
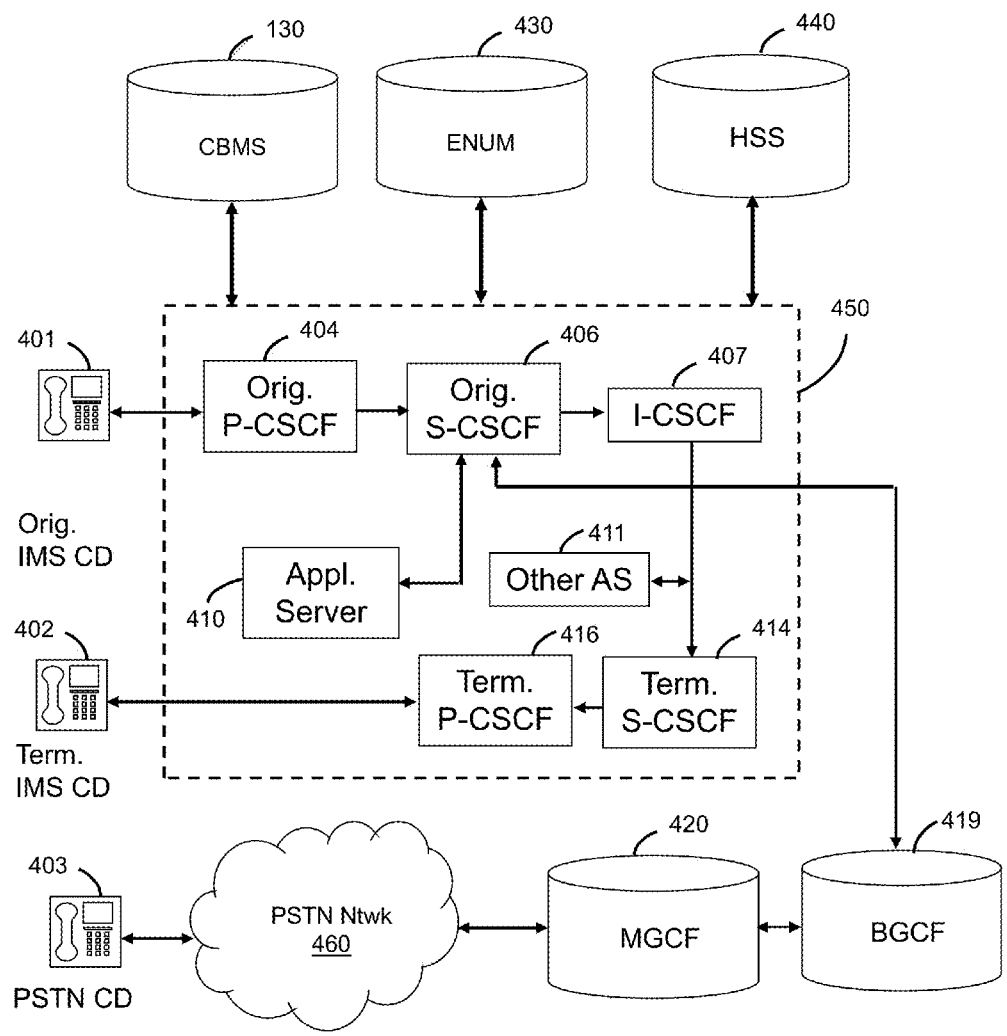

FIG. 4 depicts an exemplary embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the CBMS 130 previously discussed for FIG. 1. In this representative embodiment, the CBMS 130 can be accessed over a PSTN or VoIP channel of communication system 400 by common techniques such as described above.

Figure 5:
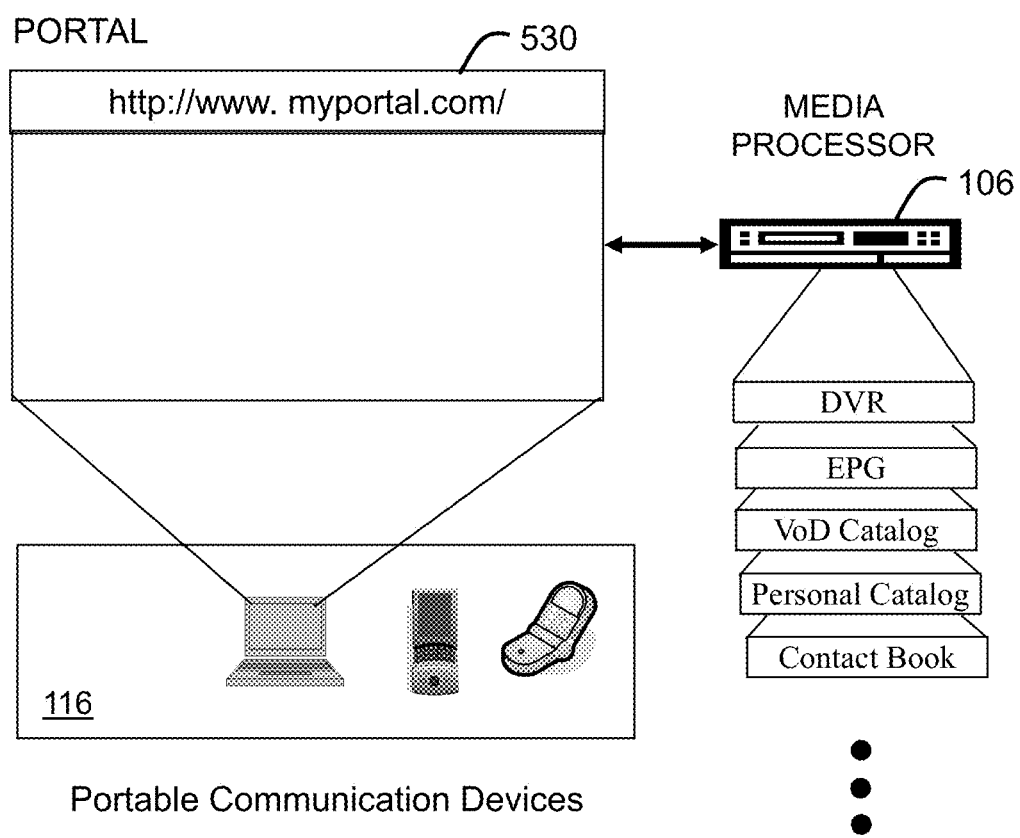
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), one or more contact books, and so on.

Figure 6:
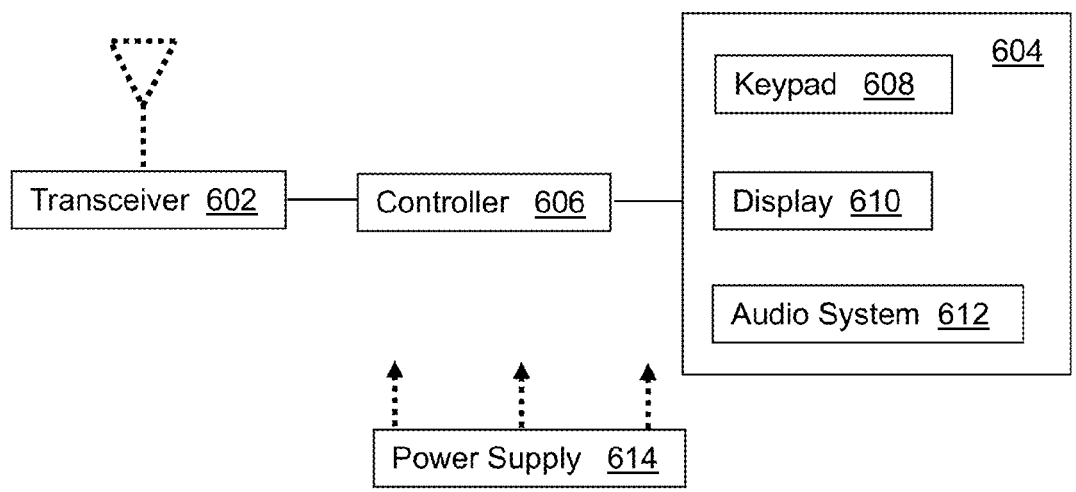
FIG. 6 depicts an exemplary illustration of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline or wireless transceiver 602 (herein transceiver 602), a user interface (UI) 604, a power supply 614, and a controller 606 for managing operations thereof. The transceiver 602 can utilize common wireless access technologies such as cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise. In another embodiment, the transceiver 602 can support short-range wireless access technologies such as Bluetooth, WiFi, or cordless technologies such as Digital Enhanced Cordless Telecommunications (DECT) or Personal Handyphone System (PHS). In yet another embodiment the transceiver 602 can support wireline technologies such as a Public Switched Telephone Network (PSTN), VoIP or IMS communications.

The UI 604 can include a depressible or touch-sensitive keypad 608 with a roller ball or navigation disk for manipulating operations of the communication device 600. The UI 604 can further include a display 610 such as monochrome or color LCD (Liquid Crystal Display) for conveying images to the end user of the communication device 600. In an embodiment where the display 610 is touch-sensitive, a portion of the keypad 608 can be presented by way of the display. The UI 604 can also include an audio system 612 that utilizes common audio technology for conveying private audio (e.g., audio heard only in the proximity of a human ear) and high volume audio (e.g., speakerphone for hands free operation). The audio system 612 can further include a microphone for intercepting audible signals of an end user.

The power supply 614 can utilize common power management technologies such as replaceable batteries, supply regulation technologies, and charging system technologies for supplying energy to the components of the communication device 600 to facilitate portable applications. The controller 606 can utilize computing technologies such as a microprocessor and/or digital signal processor (DSP) with associated storage memory such a Flash, ROM, RAM, SRAM, DRAM or other storage technologies.

Figure 7:
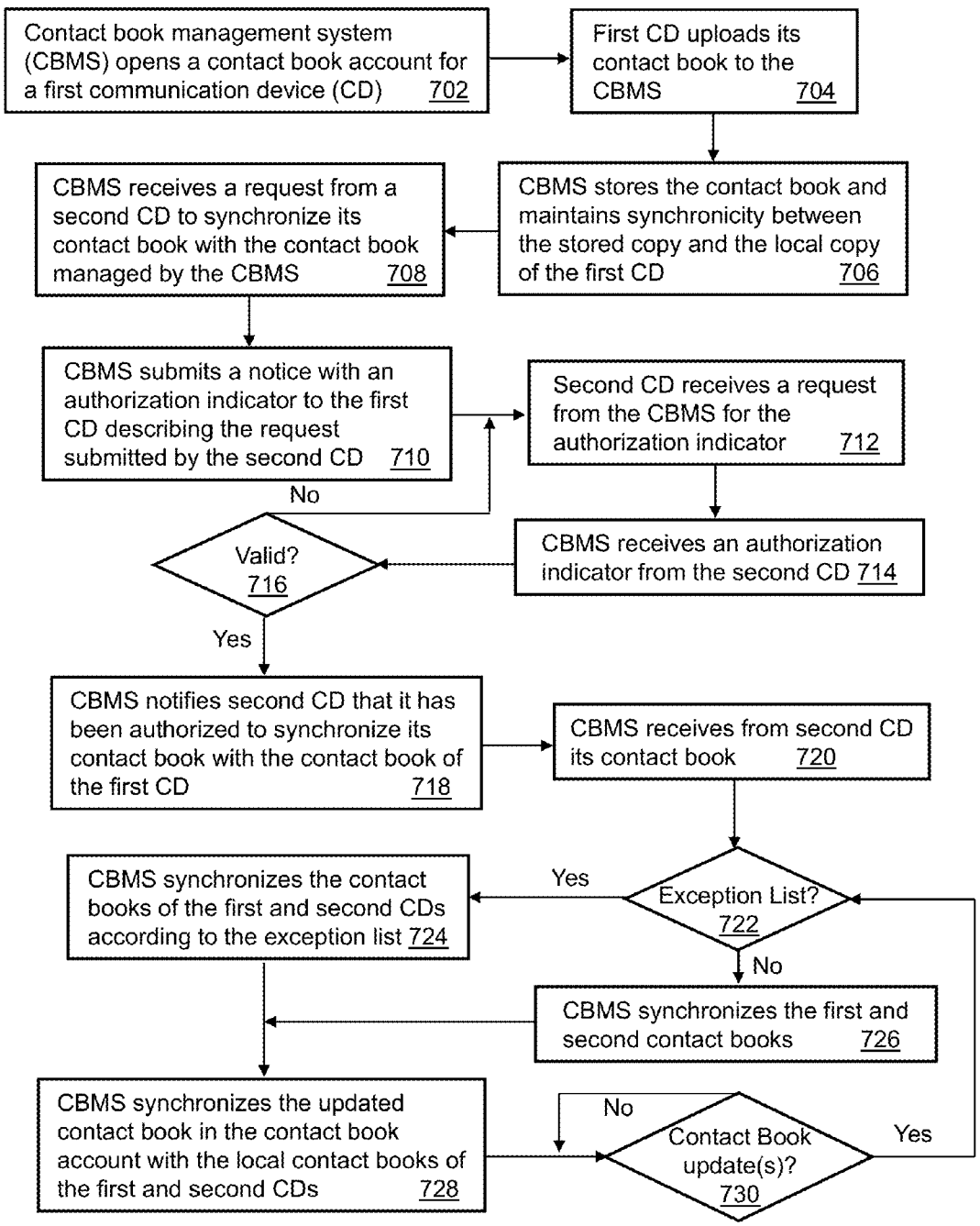
FIG. 7 depicts an exemplary method operating in portions of the communication systems of FIGS. 1-4, and the communication device of FIG. 6.

FIG. 7 depicts an exemplary method 700 operating in portions of communication systems 100-400, and communication device 600 operating in said systems. Method 700 begins with step 702 in which the CBMS 130 opens a contact book account for a first communication device (CD) operating in one of the aforementioned communication systems. As described earlier, the first CD can represent a wireless or wireline communication device. As a wireless communication device, the first CD can represent a cellular phone, a cordless phone, a computer with WiFi communications, a wireless PDA, or another suitable wireless communication device. As a wireline communication device, the first CD can represent an STB capable of storing contact book information and processing calls, a tethered phone, a softphone operating from a computer tethered to a DSL line, and so on. The first CD can also represent a circuit-switched communication device (e.g., PSTN, or cellular), or a packet-switched communication device (e.g., VoIP). In sum, the first CD can represent any present or next generation communication device which is capable of engaging in a communication session (voice, text, or otherwise) with another communication device over a communication system.

Step 702 can be invoked by the CBMS 130 responsive to a request received from the first CD over one of the aforementioned communication systems 100-400, or from a user opening an account through portal 530 by common means (e.g., an Internet browser) and registering the first CD by providing a communication identifier (e.g., E.164, SIP URI, or other means of identification), name and address of user of the first CD, and so on. The contact book account can also include a profile of desired operations such as a synchronization schedule, an exception list to preclude merging of contacts book entries with contact books of other CDs, and so on. Once the contact book account is established, the first CD can upload in step 704 its contact book to the CBMS 130. This step can occur responsive to a signal transmitted by the CBMS 130 to the first CD indicating that the contact book account is available to store its contact book. Once the contact book of the first CD is received, the CBMS 130 in step 706 stores it in the contact book account, and from thereon, maintains synchronicity between the stored copy and the local contact book copy of the first CD.

The CBMS 130 can employ any suitable synchronization protocol in step 706. For example, the CBMS 130 and the first CD can employ a synchronization markup language (SyncML) protocol to maintain synchronicity. The SyncML protocol is defined by a standards body known as the Open Mobile Alliance (or OMA). Other suitable synchronization protocols can be applied to the present disclosure. The CBMS 130 can be programmed in step 706 to periodically monitor the status of the local contact book of the first CD according to a synchronization schedule established by the user of the first CD in step 702 during device registration.

In step 708, the CBMS 130 can receive a request from a second CD to synchronize its contact book with the contact book of the first CD. The second CD can represent any one of the communication device embodiments identified for the first CD. The request submitted to the CBMS 130 by the second CD can include a communication identifier of the second CD (e.g., an E.164 telephone number or SIP URI) so that the CBMS can identify which contact book account the second CD is seeking to synchronize to. To authorize this request, the CBMS 130 can submit in step 710 a notice with an authorization indicator (such as a verification code) to the first CD. The notice can describe to the user of the first CD the request submitted by the second CD. As a security measure, the CBMS 130 can submit a request to the second CD in step 712 for the authentication indicator transmitted to the first CD.

The authorization indicator can represent a personal identification number, an alphabetic string, a numeric string, an alphanumeric string, or any other suitable indicator that can uniquely identify the authentication process taking place. The authorization indicator is transmitted by the CBMS 130 to the first CD since the user of the first CD is the owner of the contact book account, and thereby can decide whether to provide the user of the second CD access to enter the authentication indicator in the second CD responsive to the request submitted in step 712. Transmitting the authentication indicator to the first CD provides the CBMS 130 a means to authenticate that the user of the second CD is the same as the user of the second CD, or if the users are different, that the user of the first CD authorizes the user of the second CD to synchronize its contact book with the contact book of the first CD.

In step 714, the CBMS 130 receives an authentication indicator from the second CD. If CBMS 130 determines that the authentication indicator is valid by way of for example detecting a match between the received authentication indicator and the authentication indicator transmitted to the first CD, then the CBMS proceeds to step 718 where it notifies the second CD that it has been authorized to synchronize its contact book with the contact book of the first CD. Otherwise, the CBMS 130 proceeds from step 716 to step 712 where it informs the second CD of the failed attempt and requests resubmission of the authorization indicator. The CBMS 130 can be programmed to limit the number of failed attempts by the second CD to provide the authentication indicator. When such a limit is reached, the CBMS 130 can cease present and future communications with the second CD.

Once the second CD receives an indication in step 718 that synchronization has been authorized, the second CD transmits its contact book to the CBMS 130 which receives it in step 720. The CBMS 130 can then determine in step 722 if an exception list has been established. An exception list can be defined by the user of the first CD in step 702, or during any point in time by accessing the portal 530. The exception list can be used to identify one or more entries in the contact book of the first or second CDs which are not to be merged during synchronization.

If such an exception list exists, the CBMS 130 can proceed to step 724 and synchronize the contact books of the first and second CDs according to the established exception list, thereby precluding the merger of one or more entries identified in said list. The synchronized contact books can then be stored by the CBMS 130 in the contact book account of the first CD. If an exception list has not been established, the CBMS 130 can proceed to step 726 where it synchronizes all entries of the first and second contact books without exception, and stores the result in the contact book account. In step 728, the CBMS 130 can direct the synchronization of the updated contact book in the contact book account with the local contact books of the first and second CDs. Step 728 can be executed at different times for each CD.

For example, the first CD may have established in step 702 a synchronization schedule that is to occur only in the evening. The CBMS 130 can automatically establish a synchronization schedule for the second CD which calls for synchronization of the second CD periodically in the evening, and upon detecting a change in the local contact book of the second CD, the local contact book of the first CD, or the contact book stored in the contact book account. The user of the first CD can access the portal 530 at any time and modify the synchronization schedules of each of the first and second CDs to accommodate different synchronization schedules.

In step 730, the CBMS 130 can monitor updates made to the local contact book of the second CD, the local contact book of the first CD, or the contact book stored in the contact book account. If a change is detected, the CBMS 130 can be directed to steps 722-728 as previously described to re-synchronize at least a pair of the three contact book copies according to the respective synchronization schedules of the first and second CDs.

It should be noted that the terms "first" and "second" as used above are illustrative can be interchanged without adversely affecting method 700 as described.

Upon reviewing the aforementioned embodiments, it would be evident to an artisan with ordinary skill in the art that said embodiments can be modified, reduced, or enhanced without departing from the scope and spirit of the claims described below. For example, method 700 can be adapted to synchronize more than one contact book of the second CD with the contact book of the first CD. Suppose for example that the second CD is a personal home phone with multiple contact books, each contact book assigned to a different user in a multi-user household. In this illustration, the second CD can request the CBMS 130 to synchronize in whole or in part more than one of its contact books with the contact book of the first CD stored in the contact book account.

In yet another embodiment method 700 can be adapted to manage multiple contact books from both the first and second CDs. That is, suppose the first CD also has more than one contact book. The CBMS 130 can be programmed to open separate contact book accounts for each contact book of the first CD. The CBMS 130 can be directed by the user of the first CD to assign synchronization of each contact book of the second CD to a respective contact book account of the first CD.

In another embodiment, method 700 can be adapted so that the verification steps (710-716) are executed only once. Hence after the second CD has been authorized to synchronize its one or more contact books with the first CD, an authorization indicator will not be requested of the second CD in subsequent synchronization cycles, or in the instance in which the second CD adds another contact book to be synchronized with the one or more contact books of the first CD.

In yet another embodiment, method 700 can be adapted so that instead of asking the second CD to provide the authorization indicator, the user of the first CD responds with an acknowledgment authorizing the synchronization. In this embodiment, the authentication indicator requested of the first CD by the CBMS 130 can be a simple response to a prompt provided with the notice of step 710 (e.g., "Select OK if you authorize synchronization of the contact book of the second CD.").

Other suitable modifications can be applied to the present disclosure without departing from the scope of the claims below. Accordingly, the reader is directed to the claims section for a fuller understanding of the breadth and scope of the present disclosure.

Figure 8:
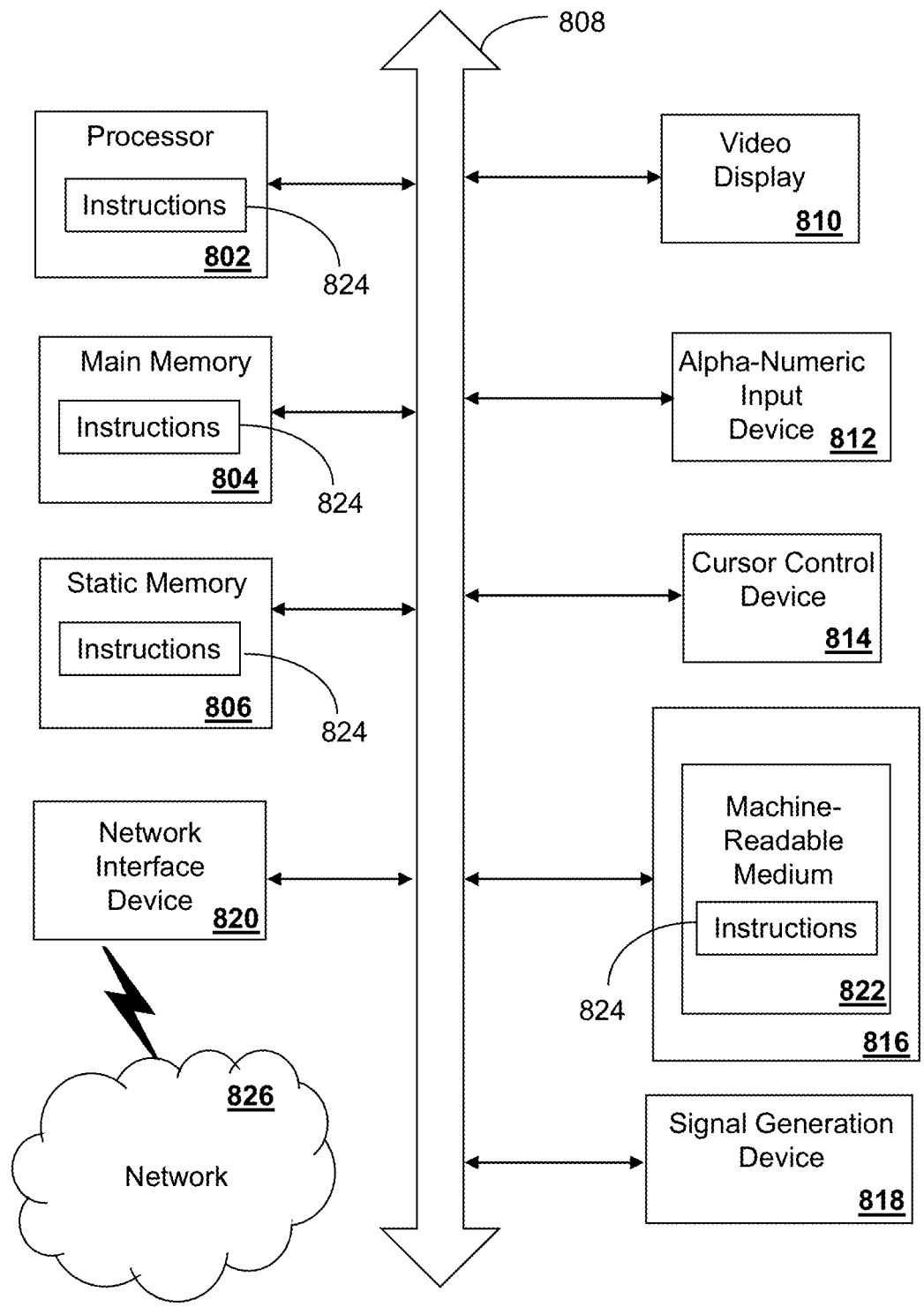
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a memory to store instructions; and
    a processor coupled to the memory, wherein responsive to executing the instructions, the processor performs operations comprising:
        receiving a telephone number from a first communication device;
        identifying a second contact book of a second communication device according to the telephone number;
        submitting a notice to the second communication device describing a request from the first communication device to synchronize a first contact book with the second contact book of the second communication device;
        submitting an authentication request to the first communication device for a verification code;
        receiving one of the verification code corresponding to a personal identification number from the first communication device or an acknowledgment from the second communication device to provide authorization for the first communication device to synchronize the second contact book with the first contact book;
        providing the first communication device with access to update in whole or in part the second contact book of the second communication device stored in a contact book account according to the authorization;
        receiving from the first communication device an entry of the first contact book according to the access to update provided;
        merging the entry of the first contact book with an entry of the second contact book to generate an updated second contact book;
        storing the updated second contact book in the contact book account; and
        synchronizing at the second communication device the updated second contact book with a second local contact book stored in the second communication device.

2. The system of claim 1, wherein the first communication device comprises one of a fixed-line circuit-switched communication device or a packet-switched communication device.

3. The system of claim 2, wherein the fixed-line circuit-switched communication device corresponds to one of a tethered communication device or a cordless communication device.

4. The system of claim 2, wherein the fixed-line circuit-switched communication device comprises a public switched telephone network communication device, wherein the packet-switched communication device comprises one of a Voice over Internet Protocol communication device or a communication device conforming to an IP Multimedia Subsystem protocol.

5. The system of claim 1, wherein the second communication device comprises a portable long-range wireless communication device.

6. The system of claim 1, wherein the processor further performs operations comprising:
    receiving an exception list of an exception entry associated with one of the first contact book or the second contact book, where the exception entry is not to be merged between the first contact book or the second contact book; and precluding the merging of the exception entry identified in the exception list.

7. The system of claim 6, wherein the processor further performs operations comprising synchronizing at the first communication device the updated second contact book with a first local contact book stored in the first communication device.

8. The system of claim 7, wherein the processor further performs operations comprising:
detecting an update made to the first local contact book;
merging the update made to the first local contact book with the updated second contact book to cause an additional update to the second contact book; and
updating the second local contact book at the second communication device according to the additional update to the second contact book.

9. The system of claim 8, wherein the updating is performed according to a synchronization schedule of the second communication device.

10. The system of claim 7, wherein the processor performs operations comprising:
detecting a second update made to the second local contact book;
merging the second update made to the second local contact book with the updated second contact book, thereby invoking an additional update to the second contact book; and
updating the first local contact book at the first communication device according to the additional update to the second contact book.

11. The system of claim 10, wherein the processor further performs operations comprising executing the updating of the first local contact book according to a synchronization schedule of the first communication device.

12. The system of claim 1, wherein the synchronizing at the second communication device the updated second contact book is performed according to a synchronization markup language protocol.

13. The system of claim 1, wherein the system comprises a web server providing portal services to one of the first communication device or the second communication device for managing contact book information.

14. The system of claim 1, wherein the processor further performs operations comprising registering the first communication device as an active contributor to the second contact book stored in the contact book account without further validation.

15. A non-transitory computer-readable storage medium, comprising instructions which, responsive to being executed by a processor, cause the processor to perform operations comprising:
receiving a telephone number from a first communication device;
identifying a second contact book of a second communication device according to the telephone number;
receiving from the first communication device a request to synchronize a portion of a first contact book of the first communication device with the second contact book of the second communication device;
submitting to the second communication device a notice of the request;
receiving an authorization indicator from one of the first communication device or the second communication devices, wherein the authorization indicator corresponds to a personal identification number;
synchronizing the portion of the first contact book with the second contact book responsive to a validation of the authorization indicator;
storing the first contact book that is synchronized in a contact book account of the second communication device; and
synchronizing at the first communication device the first contact book with a first local contact book stored in the first communication device.

16. The non-transitory storage medium of claim 15, wherein the processor further perform operations comprising:
receiving from the first communication device a communication identifier of the second communication device; and
identifying the second communication device according to the communication identifier.

17. The non-transitory storage medium of claim 16, wherein the communication identifier comprises one of the telephone number or a session initiation protocol uniform resource identifier.

18. The non-transitory storage medium of claim 17, wherein the processor further perform operations comprising synchronizing at the second communication device the contact book with a second local contact book stored in the second communication device.

19. A first communication device, comprising:
a memory to store instructions; and
a processor coupled to the memory, wherein responsive to executing the instructions the processor performs operations comprising:
transmitting to a system a telephone number of the first communication device, wherein a second contact book of a second communication device is identified according to the telephone number to synchronize a first contact book of the first communication device with the second contact book;
transmitting to the system a request to synchronize the first contact book of the first communication device with the second contact book of the second communication device;
receiving from the system a request for a verification code, wherein the verification code corresponds to a personal identification number;
transmitting to the system the verification code;
transmitting to the system the first contact book for synchronization with the second contact book responsive to the system indicating that the verification code is valid or responsive to the system indicating that the system has received authorization from the second communication device to initiate the synchronization; and
synchronizing the first contact book with a first local contact book stored in the first communication device.

20. The first communication device of claim 19, wherein the transmitting to the system the first contact book for synchronization with the second contact book is performed according to a synchronization schedule of the first communication device.

* * * * *